Patented Aug. 11, 1925.

1,549,469

UNITED STATES PATENT OFFICE.

ALBERT ERNEST DUNSTAN, OF SUNBURY-ON-THAMES, ENGLAND.

PURIFICATION OF MINERAL OILS.

No Drawing.   Application filed May 29, 1922. Serial No. 564,603.

*To all whom it may concern:*

Be it known that I, ALBERT ERNEST DUNSTAN, a subject of the King of Great Britain and Ireland, residing at Sunbury-on-Thames, England, have invented certain new and useful Improvements Relating to the Purification of Mineral Oils, of which the following is a specification.

This invention relates to the purification of mineral oils and especially of naphtha.

It will be understood that in the distillation of crude oil having a high sulphur content, the first distillate containing gasolene and kerosene has a substantial content of sulphur compounds, and it is one of the objects of the invention to purify this distillate in an expeditious and effective way.

According to the invention I treat the naphtha with aqueous solution of hypochlorous acid or chlorine water. By this means the content of sulphur in the naphtha is substantially removed. The treatment with aqueous solution of hypochlorous acid or chlorine water may without any practical disadvantage be effected under such conditions that chlorination to a slight extent results. The treated naphtha is then distilled to produce a gasolene distillate and a kerosene residue. The distillate is now substantially free from sulphur compounds. The kerosene residue is then filtered through bauxite, fluoridin, or any other suitable adsorbent material for the removal therefrom of the residual impurities including the chlorinated products resulting from the treatment with chlorine.

In carrying out the invention chlorine water, which contains hypochlorous acid, may be used or a solution of hypochlorous acid such as is produced when chlorine is passed into a suspension of calcium carbonate may be employed.

As an example of the treatment according to the invention naphtha having a sulphur content of .146% was treated with .426% of chlorine in the form of chlorine water. The treated naphtha was then washed with a weak solution of caustic alkali. The treated naphtha was then distilled and a benzene distillate produced having a specific gravity of .720 and having a sulphur content of .01 per cent and a chlorine content of .01 per cent. The distillate had an excellent smell and was found to be inert to metallic copper and gave no reaction for sulphur. The residuum was filtered through bauxite and its content of sulphur was found to be .04% while its smell and colour were excellent. The proportion of bauxite used was 2 lbs. to the gallon. The same result was secured in the filtration of the residuum in the same proportional quantity of silica gel.

It will be understood that the treatment with chlorine may be expeditiously effected without any care or precaution to avoid chlorination and that by the treatment the content of sulphur is substantially reduced and that all the chlorination products that are produced remain in the kerosene residue and are completely removed in the final treatment.

I claim:

1. A method of refining mineral oil and distillates thereof, comprising treating the oil with an aqueous solution containing hypochlorous acid, distilling a portion of the treated oil to produce a distillate substantially free from impurities and reaction products and removing the reaction products from the residuum of the distillation by treatment with an adsorbent material.

2. A method of refining mineral oil and distillates thereof, comprising treating the oil with an aqueous solution containing hypochlorous acid, then treating it with alkali, distilling the treated oil to produce a substantially pure distillate and removing the reaction products from the residuum of the distillation by treatment with an adsorbent material.

3. A method of refining distillates containing gasoline, comprising treating the distillate with an aqueous solution containing hypochlorous acid, distilling the substantially pure gasoline from the treated distillate and treating the residuum of the distillation with an adsorbent medium.

4. A method of refining mineral oils and distillates thereof, comprising treating the oil with an aqueous solution containing hypochlorous acid, distilling the treated oil to produce a substantially pure distillate, and filtering the residue through bauxite.

ALBERT ERNEST DUNSTAN.